US005574815A

United States Patent [19]
Kneeland

[11] Patent Number: 5,574,815
[45] Date of Patent: Nov. 12, 1996

[54] COMBINATION CABLE CAPABLE OF SIMULTANEOUS TRANSMISSION OF ELECTRICAL SIGNALS IN THE RADIO AND MICROWAVE FREQUENCY RANGE AND OPTICAL COMMUNICATION SIGNALS

[76] Inventor: Foster C. Kneeland, 86 Lawrence St., Haverhill, Mass. 01830

[21] Appl. No.: 646,229

[22] Filed: Jan. 28, 1991

[51] Int. Cl.⁶ .................................................. G02B 6/44
[52] U.S. Cl. .................... 385/101; 174/70 R; 174/75 C; 385/75
[58] Field of Search .................... 350/96.23; 174/70 R, 174/74 R, 75 C, 88 C, 102 R, 107, 110 FC, 113 R, 120 R, 126.1, 126.4, 130; 385/100, 101, 75

[56] References Cited

U.S. PATENT DOCUMENTS

| | | | |
|---|---|---|---|
| 4,158,478 | 6/1979 | D'Auria et al. | 350/96.23 |
| 4,301,428 | 11/1981 | Mayer | 174/36 X |
| 4,579,420 | 4/1986 | Winter et al. | 350/96.23 |
| 4,695,127 | 9/1987 | Ohlhaber et al. | 350/96.23 |
| 4,763,981 | 8/1988 | Wilkins | 350/96.23 |
| 4,867,527 | 9/1989 | Dotti et al. | 350/96.23 |
| 4,896,939 | 1/1990 | O'Brien | 350/96.23 |

OTHER PUBLICATIONS

21st (1988) Annual Connectors & Interconnection Technology Symposium Oct. 3–5 1988, pp. 71–76, Kneeland.

*Primary Examiner*—John D. Lee
*Attorney, Agent, or Firm*—Herbert L. Gatewood

[57] ABSTRACT

A compact, flexible, communications cable capable of electrical and optical signal propagation simultaneously is provided. The electrical signal is carried by coaxial inner and outer conductors of metal having suitable conductivity which surround and enclose a centrally disposed optical fiber conductor. The cable allows electrical signal propagation over a bandwidth from about 60 cycle D.C. or A.C. as well as radio frequency and microwave signals up to about 100 gigahertz without appreciable signal loss.

6 Claims, 4 Drawing Sheets

COMBINATION CABLE CAPABLE OF SIMULTANEOUS TRANSMISSION OF ELECTRICAL SIGNALS IN THE RADIO AND MICROWAVE FREQUENCY RANGE AND OPTICAL COMMUNICATION SIGNALS

BACKGROUND OF THE INVENTION (1). Field of the Invention

This invention relates in general, to signal communications cables, to their method of manufacture, and to connectors for connecting the ends of two such cables together. More particularly, the invention is concerned with communication cables capable of transmitting electrical signals, in particular, radio frequency and microwave signals, and optical signals, simultaneously. Further, the invention is concerned with means for interconnecting cable ends together.

(2). Description of the Prior Art

Communications between two points, whether across town, or around the world, depends upon the manipulation and controlling of signals within the electromagnetic spectrum. These signals are wavelike oscillations that can be described in terms of either length or frequency, i.e., the number of wave cycles per second, expressed as hertz (Hz). Ordinary alternating current from the power mains has a frequency of about 60 hertz, i.e., 60 cycles per second. High-frequency direct currents up to several gigahertz (1 gigahertz=1 billion hertz), however, are used in communications engineering and more particularly in radio communication.

Cables of the type designed for carrying high frequency radio signals (RF) and microwave signals have been known now for a number of years and have been constantly improved upon over the years. In general, such cables comprise one or more inner conductors i.e., a central conducting signal line, surrounded by a dielectric or insulating material, with an outer tubular-shaped conductor or shield surrounding the dielectric material and coaxial with the inner conductor. The outer conductor functions not only as a return electrode or ground but to protect the inner conductor signal from losses due to radiation and from outside disturbances. In some cases, a further protection layer or jacket is provided on the outside surface of the outer conductor, e.g., a tubular-shaped sheath of the same dielectric material or another plastic material offering greater abrasion resistance. The inner conductor or conductors and the outer conductor are made of an appropriate conductive metal, e.g. copper, stainless steel, silver, silver plated metals, aluminum, and various alloys. These cables are commonly referred to as "coaxial cables" and are used in various applications requiring a high frequency input. Examples include computer cables, community antenna and television (CATV) cables, and local area network (LAN) cables.

In U.S. Pat. No. 4,301,428, which issued on Nov. 17, 1981, there is disclosed a coaxial cable in which the inner conductor can be either a solid wire or a filament of glass on which has been coated a metallic or metal-like layer. This glass filament, apparently, is for the purpose of imparting its physical characteristics to the metallic layer. It is not disclosed, however, to have the characteristics of an optical layer.

Haverhill Cable & Manufacturing Corp., Haverhill, Mass. the assignee in this application, is a manufacturer of various miniature semi-rigid coaxial cables used to transmit electrical signals and which are characterized by their good flexibility and ability to be readily bent in tight environments. Such cables, in general, comprise a solid metal wire, circular-shaped, center or inner conductor surrounded by an outer, concentric seamless, tubular-shaped metal conductor with an annulus of a suitable dielectric or insulator separating the two conductors and maintaining that distance over the length of the cable. The purpose of semi-rigid coaxial cable is to transmit and/or receive a high speed, high-frequency microwave signal. Where great distances are involved, it is impractical because of cost to string a semi-rigid coaxial line; hence, an interconnection is used between semi-rigid and flexible cables. Coaxial cables manufactured by Haverhill Cable & Manufacturing Corp. can transmit and receive electrical signals over a wide frequency range, e.g., from about 60 cycles D.C. or A.C. to high frequency radio signals greater than 40 GHz (40 thousand million cycles). These latter high radio frequency cables find use in various applications, e.g., high speed computer systems, medical electronics, telecommunication systems, radar installations, and nuclear power plants. In componentry, semi-rigid coaxial cable is used, for example, in oscillators and amplifiers, printed circuit boards, and capacitor systems.

It is desired that the dielectric material used in such cables have not only acceptable insulating properties, i.e., a low dielectric constant, but low signal dissipation properties as well, i.e., that the dielectric material have a low inherent dissipation factor; otherwise, the dielectric material causes undesired attenuation of the electrical signal particularly at high radio (RF) and microwave operating frequencies of the cables. This power loss, which is sometimes referred to as "dielectric loss" contributes to the dissipation of the electrical signal. Efforts have been made over the years to improve the signal dissipation of coaxial cables, i.e., lessen the attenuation of the electrical signal, by selecting that particular dielectric material from known dielectrics so as to have the least dielectric loss properties in any particular cable construction and by creating and developing new dielectric materials, e.g., foam dielectrics from olefins and fluoropolymers. Thus, it is desired that any dielectric material used in a coaxial cable, particularly where such cable is to be used in microwave operating frequencies, be not only a good insulator but also be characterized by a low inherent dissipation factor. Moreover, the dielectric material desirably is either heat tolerant or characterized by high temperature operating properties.

The selection of any particular dielectric material for use in a coaxial cable for a specific application, however, depends not upon any one factor or characteristics thereof. Many considerations need be taken into account, in addition to those abovementioned, e.g., the end use for the particular cable, the desired overall size thereof, the operating frequencies, etc. Furthermore, consideration must be given as to the electrical conductors, e.g. the specific material of which the conductor is made, its conductivity, the relative sizes of the conductors and dielectric layer, and configuration. Thus, the design of a particular cable is not an exact science. It requires a great deal of empiricism.

For sometime now it has been desirable to transmit confidential information, military, business, or otherwise by means of a cable, rather than by radio or satellite transmission. Transmission of such information by these latter means is not secure, others desiring to do so being capable of intercepting the confidential information and acting on it, if so inclined. As a result, coaxial cable has been developed and used, in some cases at least, to transmit confidential information. Nevertheless, such coaxial cables are not entirely satisfactory, even though they may be run inside a special conduit, to mask the fact that such a cable exists. The conduit is not only relatively expensive, its very existence is believed indicative, to some at least, of a cable transmitting important or confidential information. One solution is to transmit confidential information in codes; however, this necessitates the use of expensive encoders and decoders.

Somewhat more recently optical fibers have been used in telecommunication cables by long distance telephone carriers. Accordingly, such telephone lines have been used to transmit various information, e.g., various data communications, business information, confidential information, etc. as optical signals. These hairlike fibers can transmit volumes of digitized information as pulses of laser light. At the receiving end, a photodetector senses the light pulses and translates them back into electrical signals to be routed as desired, In an optical fiber conductor, light travels along a fiber which is designed to confine the light to the interior of the fiber and allow it to follow the fiber's path, even around corners. Optical fibers, in general, comprise a central core of glass surrounded by a so-called clad, a similar material with a lower refractive index. Light pulsed through the fiber conductor is bent at the interface between the two materials toward the material with the higher refractive index—the core. Such fibers have been continually improved on over the years and can now transmit more than 95% of the light received for a distance of a kilometer. Nevertheless, the signal must be continually "repeated" over long transmission distances. The unit described "decibels (db) per meter" is used to measure how much of the light signal's strength is lost for every meter of transmission.

There are two kinds of optical fibers-multimode fibers and single-mode fibers. The latter are generally preferred as the glass core is extraordinarily narrow. Thus, the rays of light pulses have little space to bounce from side to side. As a result, the pulses of light retain their definition, permitting as many as thirty times the number of pulses/sec. to be transmitted as through a multimode fiber.

A further advantage of optical fiber transmission, compared to transmission over wire or cable, is that stray electromagnetic impulses do not effect glass as they do wires, so optical fibers are immune to errors in data or information transmission caused by electrical interferences. Thus, such transmission media is more suitable than wire or cable, in at least some cases, for transmission of highly important information such as military information. And, they offer tighter security because they are extremely difficult to tap, compared to wire transmission media. Even if such are tapped, that fact becomes readily known.

Others, heretofore, have disclosed combination or hybrid coaxial cables that comprise both electrical and optical conductors. Examples of this prior art are U.S. Pat. Nos. 4,158,478; 4,695,127; 4,867,527; and 4,896,939.

U.S. Pat. No. 4,158,478, which issued Jun. 19, 1979, discloses a coaxial optical fiber cable in which a centrally located electrical conductor of solid or several strands of copper is surrounded by an outer electrical conductor formed by one or more superposed braidings consisting of fine copper wires. These electrical conductors are separated from one another by a solid dielectric which according to the patentee may include polyethylene, polyethylene terephthalate and polystyrene used in compact or cellular form. A cladding of polyvinyl chloride surrounds the outer electrical conductor. A plurality of optical fibers surrounding the inner electrical conductor are embedded in the dielectric and are distributed symmetrically between the inner and outer conductors. While such a cable may be found satisfactory for simultaneous electrical and optical transmissions in certain applications, such a cable is not believed to be capable of transmitting electrical signals in the radio frequency range, particularly microwaves. Moreover, providing the optical fibers in surrounding, equally spaced-apart disposition about the central electrical conductor, embedded in the dielectric, presents certain problems in the handling of the optical fibers and the manufacturing of the cable. In any event, although the electrical conductors are coaxial with respect to one another, such are not coaxial with the optical fibers. The optical fibers, instead, define a circle which appears to be concentric, i.e., coaxial, with the inner conductor.

U.S. Pat. No. 4,695,127, discloses a hybrid coaxial-optical cable for concurrently carrying an electrical signal and an optical signal. The cable, as disclosed in that patent, includes a metallic conductor disposed at the center of the cable for carrying the electrical signal surrounded by a shield such as a metallic braid which is coaxial with the metallic conductor. The metallic braid is surrounded by a jacket of a tough, abrasion resistant thermoplastic material. The metallic conductor, in one aspect of the invention, is located within a buffer tube of somewhat rigid but resilient thermoplastic material surrounded by the metallic braid. The metallic conductor is held centered within the buffer tube, hence the shield, by means of a length of dielectric spacer wound around the conductor and concurrently engaging it and the inside circumferential surface of the buffer tube. Adjacent turns of the dielectric spacer are sufficiently spaced apart so that an optical conductor, which has an outside diameter much smaller than the inside diameter of the buffer tube, can also make a loose winding around the metallic conductor. In alternative constructions, optical fibers are located within a plurality of buffer tubes located within the metallic braid. These buffer tubes constitute centering means for the centrally located metallic conductor because each tube concurrently engages the metallic conductor and two adjacent tubes firmly to hold the electrical conductor centrally located in the cable. Optionally, a layer of metallic foil can be disposed under the braid and in contact therewith. Such a construction, according to the patentee, results in the lowest radio frequency leakage and lowest susceptibility to electrical noise. As disclosed in the patent, the braid functions to limit penetration of low frequency noise while the presence of the foil limits high frequency noise penetration. The hybrid cable is disclosed to exhibit relatively low capacitance because air space is left between the central metallic conductor and the braid coaxial therewith.

Although the hybrid cable disclosed in U.S. Pat. No. 4,695,127 may function quite well in some applications, its use is believed attendant with certain problems and disadvantages. First of all, the construction of the cable is relatively complex. Accordingly, its assembly, it is believed, is not that simple. Neither, it is believed, will the cable be economical to manufacture. Perhaps more importantly, however, such a cable is likely to be less bendable than desired in many applications involving the simultaneous transmission of radio frequency electrical signals and optical signals. Neither does the cable disclosed lend itself to the most compact construction desirable for many applications. Moreover, while the electrical conductors may be concentric, such are not concentric with the optical fiber conductor.

U.S. Pat. No. 4,867,527 discloses a combined electrical power and optical fiber cable which comprises a centrally disposed metallic conductor with insulation therearound, a sheath around the insulation, and a one or two part protective layer around the insulation. One or more tubes can be provided in a protective layer in each of which is located one or more optical fibers. The cables in the patent are disclosed to have substantially the same diameter as cables which are used only for conveying electric power. Although such a cable, as disclosed, may be found suitable in the simultaneous conveying of electrical power and transmission of optical signals, the cable cannot be used, it is believed, in the transmission of electrical signals, vis-a-vis electrical power, let alone those signals in the radio frequency, particularly microwave, range. Neither are the electrical conductors concentric with a fiber optic conductor so as to provide a truly coaxial cable offering the dual functions of transmitting electrical and optical signals simultaneously.

U.S. Pat. No. 4,896,939, which issued Jan. 30, 1990, to Donald G. O'Brien, discloses what is termed by that patentee, a hybrid fiber optic and electrical cable which comprises an optical fiber, a first tubular electrical conductor enclosing the optical fiber and a second tubular electrical conductor enclosing the first electrical conductor. A dielectric support element is disposed between the two electrical conductors for maintaining the conductors in coaxial relationship, with a selected uniform electrical impedance therebetween. The outer electrical conductor, in the preferred embodiment of the invention, is surrounded by an external protective layer of dielectric material. Further, there are disclosed connectors for coupling ends of the cable together. According to the patentee, the cable disclosed is capable of transmission of optical signals, wide bandwidth electrical signals, and DC or AC electrical power. While the signal communications cable disclosed in the patent may be capable of simultaneous transmission of optical and electrical signals, it is not believed capable of transmitting electrical signals in the high frequency, i.e., radio frequency particularly microwave frequency, range for various reasons. Nor was such, it is submitted, apparently even contemplated by the patentee. That patent makes no mention of the use of the cable disclosed therein at RF or microwave frequencies.

O'Brien discloses that the preferred dielectric material used in the cable construction is a tube or sheath of material such as polyethelene, a somewhat common dielectric material used in coaxial cables of relatively low operating frequency and at low operating temperature. Moreover, the patentee discloses that the outer electrical conductor can be a solid-walled tubular structure or, alternatingly, the outer conductor can be constructed from layers of conductive tape, braided or woven strands, or perforated conductive material. Such conductive materials are not really suitable for radio frequency signal transmissions. The braided shield cables are not able to carry electrical signals between two points without significant radiation loss, particularly at frequencies above 10 Hz. This is due, in part at least, to the imperfect contact between the woven, wire conductors. Such causes losses due to circulating currents.

The patentee, in U.S. Pat. No. 4,896,939, states however, that the cables disclosed therein are capable of "efficient transmission of optical signals, wide bandwidth electrical signals, and DC or AC electrical power." Nevertheless, the patent fails to define what is intended by "wide bandwidth electrical signals." It does not, it is believed, encompass high frequency, in particular radio frequency and microwave signals. If such did, no cable has been disclosed in the patent which could accomplish that purpose.

Simultaneous, multiple transmissions of messages over long distances are commonly accomplished by means of a carrier wave, i.e., a high-frequency current is modulated in various frequency ranges. For telephony, for example, a bandwidth of 3600 cycles/sec is adopted for each range and is adequate for the intelligible transmission of speech. Each range of this kind is comparable to a wire or cable and is called a channel. The frequency band, or bandwidth, of a telephony channel can, for example, be subdivided into 24 telephony channels, each of a lesser bandwidth than the 3600 cycles/sec., the bandwidth of a telephony channel. The same carrier wave can include various other electrical communication signals than telephony signals, each defined by other frequency ranges, and each signal having more or less greater bandwidths than the other. Thus, the term "bandwidth," has no definite meaning in and of itself. And, neither does "wide bandwidth." It can mean, for example, a wide bandwidth of a "transmission or carrier signal" or the wide bandwidth, i.e., the range of frequencies, occupied by any one information bearing signal that is only one of many signals accommodated by the carrier wave or transmission medium. The widebands encompassing radio frequency and microwaves and other high frequency media, such as fiber optics, can accommodate and transmit many communications, e.g., phone conversations, at one time, once the signals have each been translated to a higher frequency. This is accomplished, in general, by dividing the transmission or carrier path bandwidth, a wide bandwidth, whether wire or optical fiber, into several more narrow bands (or less wide bandwidths), each carrying, in some cases at least, a single communication. The greater the bandwidth, i.e., the wider the band, the more data that can be transmitted at any one time.

Thus, the patentee in U.S. Pat. No. 4,896,939 is believed to have contemplated an invention suitable primarily for electrical power transmission and, perhaps, the transmission of relatively low frequency electrical signals. The concern in U.S. Pat. No. 4,896,939 appears, nevertheless, to be with the transmission of electrical power to amplifiers or repeaters, for repeating the optical signal being transmitted at intervals along the conductor, to compensate for signal attenuation. Signal cables, however, are fundamentally different from power cables in both their intended use and in their design considerations and electrical properties.

Moreover, nothing is disclosed in that patent about the electrical or mechanical characteristics of the electrical signal conductors or of the optical characteristics of the optical fiber conductor. Furthermore, it is believed that any cable disclosed in that patent lacks the desired flexibility to be used in many applications for which the cables of the invention disclosed hereinafter will be found suitable.

Thus, there remains the need for a signal communications cable capable of transmitting electrical signals, particularly high frequency radio and microwave signals, and optical signals, simultaneously, of relatively simple and compact design, and with a minimum of electrical and optical signal attenuation.

SUMMARY OF THE INVENTION

The present invention has for its primary object the realization of a compact, relatively flexible, combination communications cable of relatively simple construction and design suitable for the simultaneous transmission of electrical signals and optical signals.

Another object of the invention is to provide a communications cable capable of simultaneous transmission of electrical and optical signals not attendant with the problems and disadvantages of such cables known heretofore.

The invention has also for an object the provision of a combination communications cable that is capable of transmission of electromagnetic waves in the radio frequency range, particularly microwave frequencies, simultaneous with the transmission of optical signals.

Another object of the invention is to provide a combination communications cable that possesses good flexibility characteristics and the absence of mechanical or electrical distortion upon bending.

Quite advantageously, the communications cables of this invention can transmit electrical signals over an extremely wide bandwidth in the range of from about 60 cycle D.C or A.C. to at least 100 gigahertz (100 GHz), i.e., 100 thousand million cycles/second.

A further advantage of this invention is that the preferred embodiment thereof can be used over the entire range of from about 60 cycle D.C. or A.C. to at least about 100 GHz, allowing a communications cable of the same configuration to be used in various, and a wide range of applications.

Still another advantage of this invention is that a communications cable capable of simultaneous transmission of electrical and optical signals can be provided that has an outside diameter no greater than that of a conventional optical fiber having a surrounding buffer.

Another advantage of this invention is that the optical conductor of the dual communications cable disclosed provides a means of sending secure signals from one location to another and without ready detection that such is being done, as the cable has the outward appearance of a conventional coaxial electrical cable.

A further advantage of this invention is that good mechanical adhesion is provided between the dielectric material and electrical conductors resulting in relatively low attenuation of the electrical signals.

Another advantage of the cables of this invention is that such can be subjected to wide operating temperatures, e.g., from about −65 degrees to about 250 degrees Centigrade.

A communications cable according to the invention, quite advantageously, allows electrical signal propagation in the gigahertz frequency range without appreciable loss and provides high density packaging.

Quite advantageously, a communications cable according to the invention can be manufactured quite readily and is believed more economical in cost compared to other dual function cables known heretofore.

A further advantage of a communications cables according to this invention is that such can be subjected to relatively tight bends in any particular application.

A still further advantage of the invention is that the optical fiber is protected against moisture, which offers protection against the formation of microcracks in the cladding of the optical fiber conductor.

A further advantage is that the optical fiber in the more preferred aspects of the invention is hermetically sealed offering protection to the optical fiber against harsh environments. Thus, a communications cable of the invention, particularly where optical signals are of a concern, will endure long term stability.

BRIEF DESCRIPTION OF THE DRAWINGS

For a better understanding of the invention, reference should be had to the following detailed description of the preferred embodiments of the invention which is to be read in conjunction with the accompanying drawings, in which.

DETAILED DESCRIPTION OF THE PREFERRED EMBODIMENTS OF THE INVENTION

Figure 1:
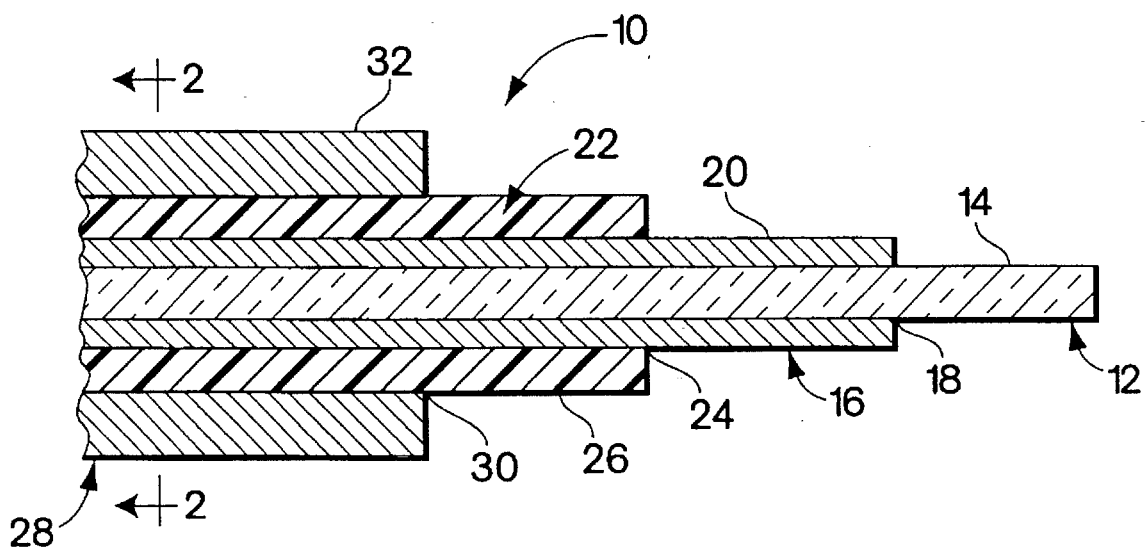
FIG. 1 is a sectional view of a portion of a length of a communications cable according to the invention cut away so as to see the relationship of the various components comprising the cable.

Turning now to FIG. 1 of the drawing, there is shown therein a coaxial communications cable 10 according to one aspect of the invention. The cable 10 comprises a centrally located, solid, circular-shaped, elongated optical fiber 12 of suitable predetermined diameter defining a circumferential surface 14 surrounded by an inner electrical conductor 16 in adhering contact with the optical fiber and in coaxial disposition thereto. This annular-shaped, inner conductor is defined by predetermined inner (I.D.) and outer (O.D) diameters defining inner and outer circumferential surfaces 18, 20, respectively.

Figure 2:
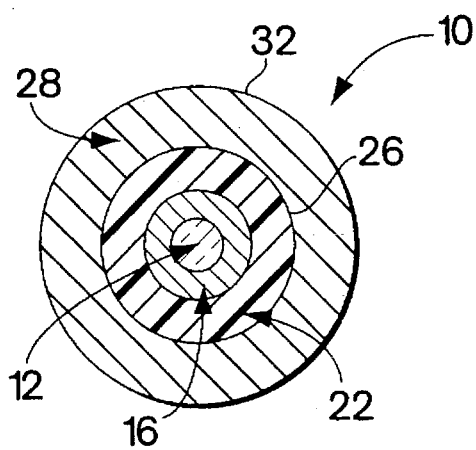
FIG. 2 is a view in cross-section of the communications cable shown in FIG. 1.

The inner electrical conductor 16 is surrounded by an annular-shaped dielectric member 22 coaxial to the optical fiber conductor 16 defined by predetermined inner and outer diameters which, in turn, define the inner and outer peripheral surfaces 24, 26, respectively. The dielectric 22 is in adhering contact with the inner conductor and is surrounded by an annular-shaped outer, or return, electrical conductor 28. This conductor is in adhering contact with the outer dielectric surface and is defined by predetermined outer and inner diameters. These diameters define inner and outer circumferential or peripheral surfaces 30, 32, respectively. As will be seen by reference to FIG. 2, the inner and outer conductors are coaxial with one another. The outer conductor 28 is critically of a solid material in the event the cable is intended for high frequency applications, i.e., radio frequency and microwave, thereby providing maximum shielding of the inner conductor against losses or radio frequency leakage due to radiation and against outside disturbances. If desired, although not shown in the drawings, a tubular sheath of suitable plastic material such as the dielectric material can be provided coaxially surrounding the outer surface of the outer conductor 28. Thus, further protection against radiation leakage and outside disturbances will be provided. This outer protective sheath can be of a material offering greater protection against abrasion or the environment, as now commonly provided in coaxial electrical cables.

The optical fiber core 12 can be any available communication grade optical fiber manufactured from any of various known optical fiber compositions according to well known techniques. The selection of any particular optical fiber composition may depend somewhat upon the particular application intended for a communications cable of this invention. This is well within the skill of the art. In general, however, and as is well known, the optical fiber 12 comprises a core and a clad or cladding (neither shown individually in the drawings). These are each commonly of a different refractive index, as desired.

The core and clad can be made of any material suitable for use as an optical fiber, such as silica glass or quartz. A glass on glass fiber, e.g., silica core/fluorosilica clad fiber has been used in the practice of the invention. Dimensionally, the core may typically have an outside diameter of about 50 microns (i.e., about 0.00197 inch), and the outside diameter of the clad will then typically be about 125 microns (or 0.00492 inch). Nevertheless, the dimensions of the optical fiber for use in the invention can vary somewhat, e.g., the core from about 8 microns to about 100 microns, with the clad from about 125 microns to about 140 microns. The core to clad ratio can also vary somewhat depending upon the particular core/clad compositions used. The O.D. of both the core and clad will depend somewhat upon the particular application for the cable.

The manufacture of optical fibers is well known by those skilled in the art. One such method involves, in general, the preparation of a so-called "preform" of the core and clad, and then drawing the preform down through a die at a temperature below the melting point of the preform, to reduce the diameter and elongate the fiber. Commercially available optical fibers can be used in the practice of the invention. In such case, however, the optical fiber will critically have no coating thereon, e.g. buffer and other protective coatings, other than specifically set forth herein.

The attenuation of the optical fiber will, of course, depend somewhat upon the particular fiber type, the core/clad compositions involved, and the core/clad ratios. The optical fibers should preferably be suitable for use over a wide temperature range, e.g., preferably from about −65 degrees C. to about 250 degrees C. but at least from about −40 degrees to about 125 degrees C. The optical fiber should accommodate an optical signal having a bandwidth of from about 20 to about 1500 MHz/km, depending somewhat upon the particular application for the communications cable. Single mode and multimode optical fibers can be used; however, single mode fibers are preferred as such can accommodate greater bandwidths.

The inner electrical conductor 16 can be of various electrically conductive metals known to those in the art, as hereinafter more fully described. This will be determined, in part at least, by taking into account the intended application for the communications cable and the necessary values of resistance inherent in any particular metal. Importantly, however, the inner conductor will be of a minimum thickness consistent with the desires to accomplish the intended electrical transmissions. An inner conductor having a thickness in the range of from about 10 to 18 microns (0.0003 to 0.0006 inches) will be found suitable in the preferred aspects of this invention, i.e., radio frequency transmissions. Nevertheless, at lower frequencies, in applications involving high power requirements, the inner conductor should be of somewhat greater thickness. Otherwise, the inner conductor 16 may be burned off.

Quite advantageously the inner conductor 16, as such is in adhering contact with the optical fiber 12, provides not only an electrically conductive layer but one that offers protection to the optical fiber from any environmental conditions in which the coaxial cable 10 is used that might be detrimental to the optical fiber. In the preferred aspects of the invention, this inner conductor will hermetically seal the optical fiber, providing protection against moisture and long life to the cable 10.

The outer electrical conductor 22, like inner conductor 16, can be of various metals depending upon the conductivity desired. The inner and outer conductors need not necessarily be of the same composition. Importantly, however, in applications involving high frequency transmissions, e.g. radio and microwave frequency, the outer metal conductor 22 need be a solid tubular-like structure, e.g. a seamless tube of copper. This construction insures the microwave frequency transmission at the higher frequencies, e.g., greater than 100 GHz (one hundred thousand million cycles per second). Moreover, the radiation losses of the inner conductor i.e., radio frequency leakage, will be minimized, as the solid metal outer conductor provides total radio frequency shielding. The outer metal conductor 22 is desirably of copper as such is a good conductor of radio frequency signals. Nevertheless, other conductive metals can be used, as desired. This will depend to some extent upon the design considerations of the cable 10 for the particular intended application. The outer conductor can, if desired, be of an aluminum base coated with a layer of copper according to conventional techniques. Or, in some applications, it can be of a copper base provided with a silver plate to prevent oxidation during manufacture and to improve the solderability of the finished cable product. The outer conductor 28 can, if desired, be provided with an outer layer or plate to meet unusual environmental applications such as salt spray, high humidity, etc. or to improve solderability. The inner conductor 16 can also be of copper, if desired. Or, it can be of other conductive metals, the same or different from that of the outer conductor 28. Nevertheless, the inner conductor preferably is of silver as such provides good conduction of radio frequency signals. In any event, the inner and outer conductors should preferably be of materials having low inherent resistivity.

The outer conductor 28 can have a thickness in the range of from about 100 microns to about 300 microns. The thickness preferably will be at the lower end of the range, however, as such will, in general, allow greater use for a communications cable according to the invention. Nevertheless, this thickness will depend somewhat upon the desired overall outer diameter of the cable 10, as well as upon the relative diameters of the inner conductor 16, optical fiber 12, and dielectric member 26.

Further, the diameter of the outer conductor 28 will be determined by the operating frequency and type of electromagnetic radiation that it is desired to propagate, as well as the dielectric constant of the dielectric material used in cable 10. The O.D. of the outer conductor 28, i.e., the outer circumferential surface 32 of the conductor, as will be readily appreciated by those skilled in the art, maximizes the mechanical integrity of the cable 10 and provides the desired interface with any connectors for connecting two lengths of cable together. The inner circumferential surface of the outer conductor acts, in contrast, as the prime electrical conductor of the outer conductor.

The dielectric or insulator member 22 is an annulus of suitable inside and outside diameters, as earlier disclosed, defining inner circumferential surface 24 and outer circumferential surface 26. As shown in the drawing, the inner circumferential surface 24 surrounds, and is coaxial with, the metal layer 16 and is in tight adhering contact with its outer circumferential surface 20. The inner circumferential surface 30 of the outer electrical conductor 28 is in tight adhering contact with the outer circumferential surface 26 of the dielectric material 22. The diameters of the dielectric layer can vary somewhat, as desired, e.g. in the preferred aspects of the invention the inside diameter can vary from about 274 microns to about 299 microns, and the outside diameter from about 914 microns to about 965 microns. The diameters will depend somewhat, in any particular case, upon the overall desired diameter of the communications cable 10, the relative diameters of the outer and inner conductors, as well as the dielectric constant and dielectric loss of the dielectric material. The dielectric material employed, in any particular case, should be of a low energy loss at the intended operating frequencies for the cable 10. In general, the lower the dielectric constant, the higher the operating frequencies that can be transmitted by the cable.

The dielectric member 22 functions not only to support the outer conductor but also to maintain the desired distance and geometry between the inner and outer electrical conductors. It functions also not only to maintain the desired impedance between the two conductors and uniformly along the cable length but also to maintain and determine the overall size of the cable. Moreover, the dielectric member helps to assure mechanical and electrical integrity of the cable during forming and bending in any particular application in which the cable is used.

Various dielectrics or insulating materials may be found satisfactory for the purposes of this invention, provided, in the preferred aspects of this invention such are also suitable for radio frequency and microwave transmission with reasonable attenuation of signals. This will depend somewhat upon the particular results desired. In general, however, the lower the dielectric constant of any particular insulator, the lower the bulk loss and electrical signal attenuation and the higher the velocity of propagation of the cable. Nevertheless, consideration need also be given to the ability of the dielectric to mechanically adhere to or attach itself to the particular inner and outer conductors in the cable. Where this bond is not good, forming and bending of the cable will result in separation, or at least partial separation, of the dielectric from one or the other of the electrical conductors, or both. Such separation results in undesirable attenuation of the electrical signals, particularly critical at the higher radio frequencies and microwave frequencies for which a cable of this invention is ideally suited. Of concern also in the selection of a suitable dielectric is the intended operating temperature for the cable. For example, cable exposure to high temperatures may cause stressing of the outer conductor relative to the dielectric where the thermal coefficients of the material of the two members are substantially different. In some cases where operating temperatures involve a substantial range, the expansion and contraction of the outer conductor may even result in a permanent set increased diameter. Where this occurs, among other things, the impedance between the two conductors may be undesirably increased, accompanied by a decrease in capacitance, and lack of adhesion between the various components of the cable.

In the practice of the invention, an annulus of polytetrafluoroethylene as the dielectric member 22 has been found quite satisfactory and is the preferred dielectric member, particularly for transmission of high frequency signals. Such dielectric material is readily available commercially from E. I. Dupont de Nemours under the trade designation Teflon and has a dielectric constant of 2.1. Quite advantageously this dielectric material will be found suitable in various uses of a cable according to the invention, even with lower frequency transmissions. Moreover, such dielectric material is suitable over wide temperature range and has good signal attenuation characteristics even at 125 degrees C.

The dielectric or insulator member 22, in the preferred aspects of the invention, must have a dielectric strength of at least about 2 KV RMS at 60 Hz. The lower the dielectric constant, moreover, the greater the resistance to transmission of an electrostatic force from the inner conductor 16 to the outer conductor 28, or vice versa. The most suitable dielectric constant, hence dielectric or insulator material to be used, for any cable according to the invention, will depend somewhat upon the particular intended application for the communications cable. The dielectric constant should, in the most preferred aspects of the invention, be no greater than about 2.1, preferably no greater than about 1.5, at temperatures of from at least about −40 degrees C. to about 125 degrees C. It is anticipated that the communications cable of the invention will find particular use in applications where it is subjected to such a range of temperatures.

Figure 3:
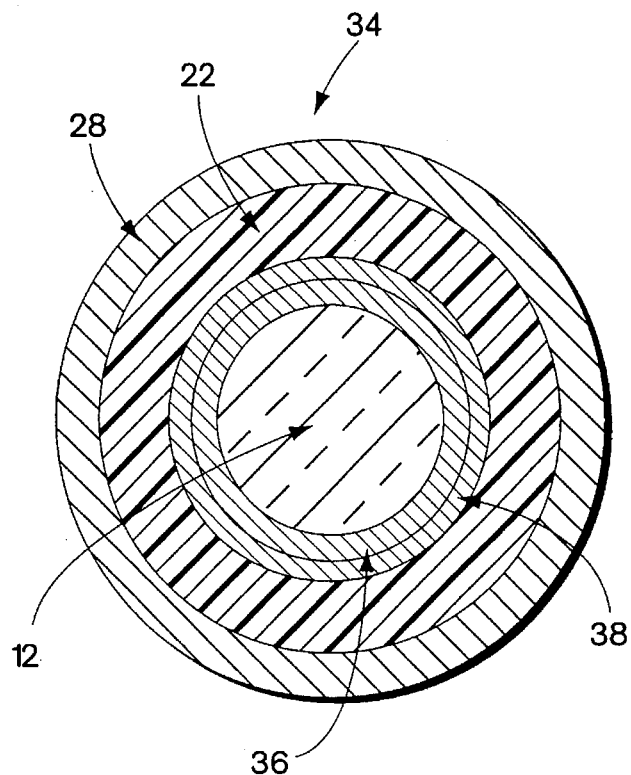
FIG. 3 is a view in cross-section of another communications cable according to the invention showing a metal clad optical fiber surrounded by a second metal layer of a more desired greater electrical conductivity.

Turning now to FIG. 3 there is shown another communications cable 34 according to a further aspect of the invention. The communications cable 34 has a coaxial metal layer 36 surrounding and adhering to the optical fiber 12. The metal layer 36 is surrounded by a second metal layer 38. This metal layer can be a very thin layer of suitable electrically conductive metal, e.g., a 0.0003 to 0.0006 inch thick layer of silver. The metal layer 36, in such a case, need not be electrically conductive at all, or it can be much less conductive than silver, thereby providing some economies in the manufacture and use of a signal communications cable according to the invention. The manner of providing such an inner conductor will be made more clear later on.

In the more preferred method of manufacture of a communications cable 10 according to the invention, an optical fiber 12 is provided with a metal layer, at the time of formation of the optical fiber. Thus, the optical fiber will be hermetically sealed and protected against moisture. More importantly perhaps, at least from the stand-point of electrical signal transmission, the inner conductor is fused to the optical fiber during the fiber drawing operation, and is not a separate tube. This method insures that the optical fiber will not move inside the inner conductor tube. And, the vacuum deposited metal, i.e., inner conductor, can be provided in extremely long lengths. If the construction of the cable is to be that of cable 10 shown in FIG. 1, this metal layer must have the electrical conductivity desired. The optical fiber 12 can be coated on its entire periphery with a suitable metallic or metallic-like layer formed by any known means, e.g. vacuum deposition, chemical deposit, gaseous or liquid phase techniques, evaporation, etc. Importantly, however, whatever the manner of providing the metal layer 16, this layer must be uniformly applied to the optical fiber whereby to provide a uniformly thick conductive layer. If desired, a unitized metal coated optical fiber can be used, as the starting point for the manufacture of the communications cable 10. Such a metal coated fiber found suitable in the practice of this invention is available commercially from the Hughes Aircraft Company under the trade designation HAC-200. In general, this optical fiber is manufactured from a preform of glass on glass, an optical fiber having a silica core/fluorosilica clad. The optical fiber used in the practice of the invention has an O.D. of 0,011 inch with a clad to core ratio of about 2.5. The metal coating, in this case aluminum, is applied to the optical fiber as the fiber is drawn. Thus, as desired, in the more preferred aspects of the invention, the optical fiber 12 is advantageously not only provided with an electrically conductive layer 16 but such layer also protects the optical fiber with a hermetic coating before moisture has a chance to degrade the pristine strength of the fiber.

The diameter of the outer conductor, in any particular application, will be determined by the particular frequency and type of radiation that it is desired to propagate, and upon the dielectric constant of the insulating material. In general, however, the smaller the diameter of a communications cable according to the invention, the higher the frequency that it can transmit. Thus, it is desirable that a preferred cable of the invention be no more than from about 0.034 inch (O.D.) to about 0.141 (O.D.), preferably about 0.047 inches O.D. The preferred cable will have an O.D. no greater than a conventional 0.047 inch copper jacketed, acrylate buffered, optical fiber, yet be cable of transmitting optical signals and electrical signals simultaneously. This is of particular importance in the miniaturization trend in the communications field.

A cable according to the preferred aspects of the invention should exhibit no undue stresses in a temperature range of from about −65 degrees C. to about 250 degrees C., preferably −40 degrees C. to about 125 degrees C., and even more preferably −40 degrees C. to 100 degrees C., and have an impedance from about 25 ohms to 75 ohms, preferably at least about 50±0.5 ohms.

If the coaxial communications cable of this invention is to be of the construction of cable 34 shown in FIG. 3, a unitized commercial metal coated glass fiber such as above described can be the starting point. In this case, the metal coating first applied to the optical fiber can be any metal desired so long as such will be firmly adhered to the surface of the optical fiber 12, e.g., tin, aluminum, or indium. An advantage of this cable construction is that a less expensive metal can be used, whether or not electrically conductive, or conductive to the degree desired, applied directly to the optical fiber surface, followed by application of a suitably conductive metal in a very thin strike layer, according to conventional techniques. Such a layer need, however, bond securely to the first applied metal layer so that the two layers will not delaminate when the communications cable is formed or bent during use. Accordingly, a layer of a more conductive metal, i.e., one of lower electrical resistance is most preferably applied over the above-mentioned commercially available metal coated optical fiber. The most preferred such conductive metal is a layer of silver metal applied to the aluminum layer according to usual techniques well known to those skilled in the art.

The dielectric member 22 can be provided over the inner conductor by various techniques known to those skilled in the art. Such will depend to some extent upon the particular dielectric material being used. Preferably, the dielectric member 22 will be applied by conventional extrusion techniques. Thus, the metal coated optical fiber, whether of the construction shown in FIG. 1 or FIG. 3, can be advanced according to usual techniques through the central opening in a common extruder head. The Teflon dielectric material will then be directed into the extrusion head through a channel in surrounding relationship with the inner conductor coated optical fiber. Nevertheless, in some applications, at least, the dielectric can also be applied in tape form and wrapped around the metal coated optical fiber. In this case, each wrap of the dielectric tape entraps some air, resulting in an even somewhat lower dielectric loss. With this lower attenuation of the electrical signal, such a communications cable according to the invention can be used in applications involving higher temperature environments, e.g., 250 degrees C. Importantly, however, the dielectric layer must be uniformly dimensioned throughout its length, to provide uniform impedance along the length of the cable, the same as is the various other components in the cable. This is well within the skill of the art.

This assembly comprising the dielectric member, inner conductor and optical fiber conductor is then slid into a tubular-shaped metal sheath in known manner suitably dimensioned internally to accommodate the assembly. The metal sheath should be seamless and can be any suitable ductile material each as copper or aluminum. If the communications cable is intended for use in radar systems, a copper sheath is preferred.

This further assembly is then mechanically reduced to the desired size (O.D.), and the outer conductor 28 swaged thereon according to usual technique by passing the same through successive conventional dies, having progressively smaller openings e.g. incrementally dimensioned to 0.0001 inches. Thus, the outer conductor is compressed to the desired extent against the dielectric and the dielectric against the inner conductor providing the desired mechanical adhesion between the mating peripheral surfaces. Also, of importance, the desired ductility of the outer conductor will be substantially maintained resulting in a communications cable having good flexibility characteristics, a property highly desired in many applications where the cable must be subjected to tight bends. In the more preferred cable of the invention, the assembly to be reduced consisted of an aluminum metal coated optical fiber (optical fiber O.D. 125 microns; metal coated optical fiber O.D. 0.011 inches) provided with an annular-shaped Teflon dielectric member (I.D. 0.011 inches, O.D. 0.037 inches) and an annular-shaped outer conductor of copper (I.D. 0.045 inches, O.D. 0.053 inches). This assembly was reduced in size to provide a communications cable having an O.D. of 0.047 inches by passing the assembly successively through two conventional draw dies each incrementally dimensioned to 0.0001 inches, the first being 0.0471 inches and the second die being 0.0470 inches, the two dies being spaced-apart from one another about two inches. Thus, as earlier described, the adhesion on both outer conductor to dielectric and inner conductor to dielectric can be controlled, as well as any work hardening of the outer conductor. The draw down can vary somewhat in the manufacture of any particular cable, provided the relatively soft characteristics of the outer conductor are maintained and the desired adhesion levels between the outer conductor and dielectric are attained. The optimum number of draw downs, the increment of draw down by each die, and the spacing between the dies can readily be determined by those skilled in the art, keeping in mind the desired characteristics in the communications cable. The adhesion level between the outer conductor and dielectric should desirably be in the range of from about 6–12 lbs., preferably about 10 lbs., as determined by conventional adhesion tests for semi-rigid coaxial cables over a 6 inch length or section. Thus, delamination between the outer conductor and dielectric member along the entire length of the cable will be prevented, resulting in uniform impedance. Suitable adhesion between the outer conductor and dielectric will inherently provided satisfactory adhesion between the inner conductor and dielectric. Importantly also, draw down to the desired adhesion will inhibit any wicking action by the cable, extending use of the cable to somewhat otherwise damaging environmental conditions such as moisture. Importantly, the reduction of the assembly above disclosed is such as to reduce the inside diameter of the outer conductor 28 to slightly less, e.g. about 0.0005 inches less than the O.D. of the dielectric member before reduction. Thus, the dielectric member is compressed radially inwardly sufficient to provide the desired adhesion between the opposing dielectric layers and those of the inner and outer conductors. The reduction process need be so conducted that the metal sheath, i.e., the outer conductor, remains in the same soft annealed condition as it was prior to assembly. Thus, when used, the more preferred communications cable of this invention can be formed with tight bend radii, not so with dual function cable disclosed heretofore, permitting higher yields both electrically and mechanically. Furthermore, the communications cable of this invention can be used in more and various applications than dual function cable of the prior art and can be particularly used in smaller packaging of electronic systems.

The communications cable components of this invention, both the conductors and insulation, can be closely controlled to predetermined inner and outer diameters by techniques well known to those in the coaxial cable field. And these components can be assembled in such a manner that the desired tolerances are maintained throughout the entire cable length. The particular dimensions of a cable according to this invention, however, will be determined primarily by the electrical characteristics desired of the coaxial cable, and the optical characteristics desired in the optical conductor.

Furthermore, as a result of such processing, the communications cable of the invention, when bent, has no spring back. Thus, the cable will hold to a desired dimensional tolerance and can be unbent and reshaped, if needed, in a particular application.

In general, the electrical transmission losses should be no greater than, particularly in the preferred aspects of the invention, about 200 dB/100 ft, at 40 GHz. The electrical attenuation of the communications cable can be measured at various frequencies according to usual techniques. In order to determine the dielectric loss attributable to the TEFLON dielectric, the metallic loss (i.e., the attenuation of the metallic core and sheath components) can be calculated. The difference between the total cable attenuation and the metallic loss is the dielectric loss.

The more preferred signal communications cable of the invention will have the following approximate properties:

RADIO FREQUENCY ELECTRICAL CHARACTERISTICS

| Frequency | Attenuation dB/100 ft @ 20 degrees C. | Average Power Watts, unity VSWR, 40 degrees C. ambient |
|---|---|---|
| 1 GHz | 33 | 32 |
| 10 GHz | 116 | 9 |
| 20 GHz | 170 | 6.5 |

OPTICAL CHARACTERISTICS

| | |
|---|---|
| Attenuation | 1 dB/km |
| Bandwidth | 100–1500 MHz/km |
| Wavelength | 850 through 1300 NM |

The communications cable of this invention provide exceptional radio frequency and optical performance. Such can be terminated with either solder or crimp style connectors. If desired, a cable according to the invention can be terminated by adhesively securing the connector to the outer conductor or jacket, e.g. using a conventional electrically conductive epoxy resin adhesive.

Figure 4:
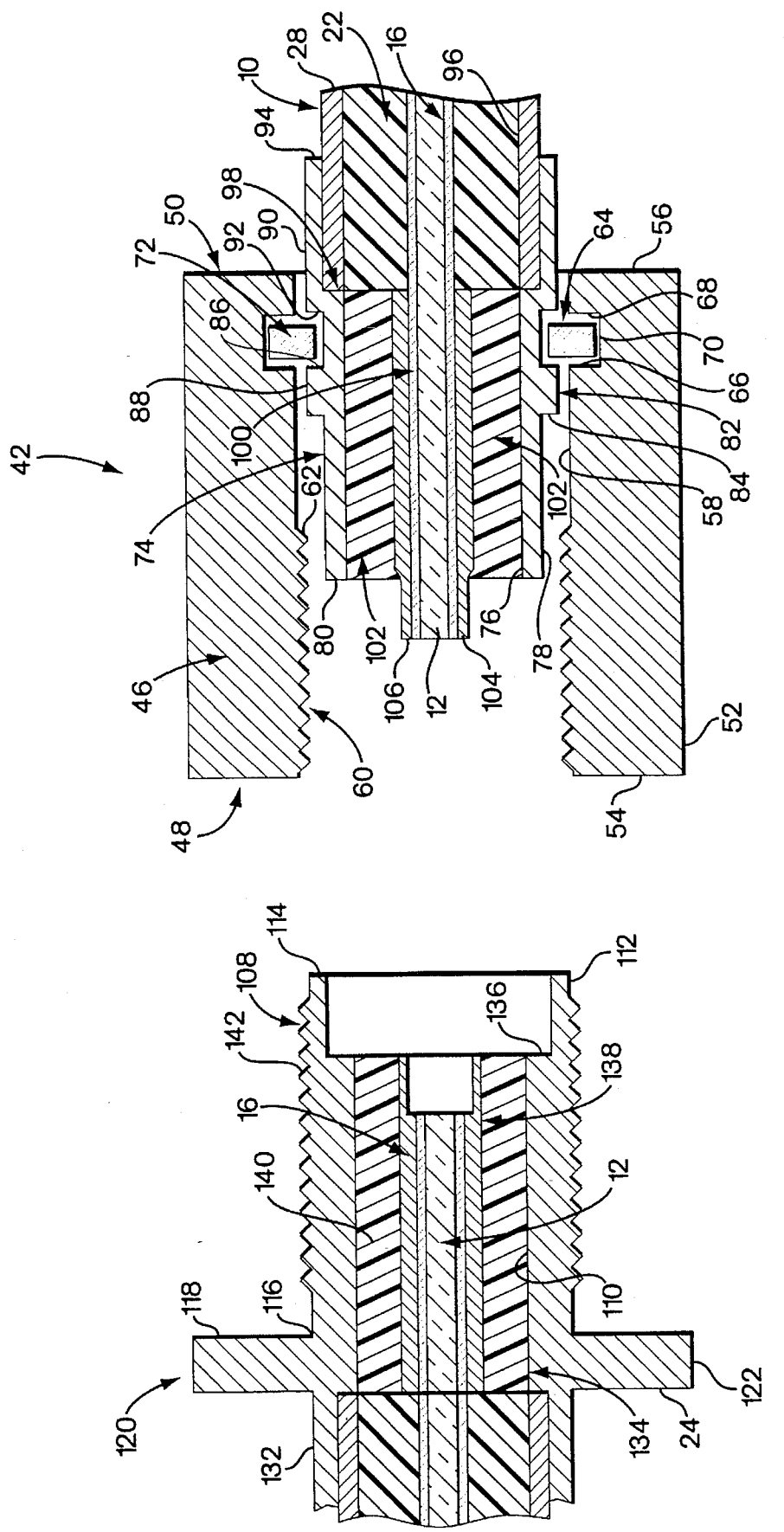
FIG. 4 is a longitudinal sectional view of a connector according to the invention for connecting the ends of two cable lengths of the cable shown in FIG. 1 together.

Turning now to FIG. 4 of the drawing, there is disclosed therein a cable connector for coupling the ends of two like cables 10 together comprising a male plug housing 42 and a female jack or housing 44. As shown in the drawing, the male plug housing 42 comprises an elongated annular-shaped body member or coupling nut 46 having a front end 48 and a tail end 50. The body member 46 is defined by a predetermined outer diameter defining a horizontally disposed circumferential outer surface 52 having planar annular-shaped end faces 54, 56 perpendicularly disposed thereto. The annular-shaped end face 54 defines a circular shaped opening defining an inner circumferential surface 58. This inner surface is provided with a thread pattern 60 according to conventional techniques which extends inwardly a predetermined distance from the front end of the plug housing 42 terminating at the circular-shaped back edge 62. The inner surface 58 terminates at the tail end 50 of the coupling nut 46 and defines a circular-shaped opening concentric to that at the front end 48. Provided in the inner surface 58, adjacent the tail end of the locking nut and suitably inwardly therefrom is an annular-shaped groove 64. This groove is defined by spaced-apart parallel side walls 66, 68 extending inwardly from the inner surface 58 and perpendicular thereto. These sidewalls terminate in a circular-shaped surface 70 concentric to the inner surface 58. Located in the groove 64 is a conventional retaining ring 72, the purpose for which will soon be made clear. This ring can be of any desired material conventionally used for such purposes but is desirably a spring like annular-shaped metal ring conforming to the shape and dimensions of groove 64.

As shown in FIG. 4 of the drawing, one end of a communications cable 10 is located in the male plug member 74. The plug member 74 is of an elongated annular-shape defined by predetermined inner and outer diameters which define inner and outer circumferential surfaces 76, 78, respectively. These circumferential surfaces are defined by a planar end face 80 perpendicularly disposed to the inner/outer surfaces 76, 78. On the outer surface 78 of the male plug member, and desirably integral therewith, there is provided an annular-shaped outwardly protruding retention member 82 defined by annular-shaped V front and back edges 84, 86 perpendicular to the outer surface 78 and circular-shaped outer edge 88 concentric to the circle defined by the outer surface 78. The circular-shaped outer edge or surface 88 is concentric with the outer peripheral surface 90 of the back portion of the male plug member 74. The outer surface 90 is defined by ends 92, 94 parallel to one another and perpendicular to the outer surface 90. The outer end 94 defines the entry end of a circular-shaped opening defined by the inner peripheral surface 96 which is concentric with the inner peripheral surface 76 and of somewhat larger diameter, the reason for which will soon be disclosed. The ends 86, 92 define annular-shaped parallel surfaces perpendicularly disposed to outer surfaces 88, 90 which define an annular-shaped groove opposed to groove 64 for location of the retaining ring 72. Inner surface 96 terminates at annular-shaped shoulder 98 and which is perpendicular to and connecting with inner peripheral surfaces 76, 96. As seen in FIG. 4, the diameter defining the inner surface 96 is just sufficiently large enough to accommodate the communications cable 10. The leading end of the cable 10 is stripped of the dielectric 22 and outer conductor 28 leaving a predetermined length of the only optical fiber 12 and inner conductor 16, which extends outwardly a predetermined distance beyond the end surface 80. The inner conductor 16 is coaxial with the tubular-shaped electrical contact 100 which, in turn, is coaxially enclosed by a dielectric member 102. This dielectric member is desirably of the same material as the dielectric member 22. The electrical contact 100 is tapered adjacent its front end 104 which is in the same plane as end 106 and which plane is perpendicular to the optical fiber lengthwise direction. As shown in the drawing, the annular-shaped shoulder 98 is essentially coplanar with the end of the outer conductor 28 and of the same inside and outside diameters. Thus, the male plug member 74 becomes an extension of the outer conductor. The end of cable 10 is secured in the male plug member 74 by means of a conventional suitable electrically conductive adhesive such as an epoxy resin earlier disclosed. The adhesive provides an interfacing layer (not shown) between the meeting surfaces of the outer conductor 28 and inner circumferential surface 96. It will be appreciated, however, that the end of cable 10 can be fixedly secured to the male plug member by other means used for such purposes and known to the art such as soldering if desired.

The female jack 44, as shown in FIG. 4, comprises an elongated annular-shaped front body member 108 defined by predetermined inner and outer diameters defining an inner circumferential surface 110 and an outer circumferential surface 112 having a front end 114 and a back end 116. The back end of body member 108 terminates at the front surface 118 of the circular-shaped flange 120. This flange is further defined by a circular-shaped outer edge 122 concentric to the outer and inner surfaces 110, 112 and planar, annular-shaped back surface 124 parallel to surface 118 and perpendicular to the outer edge 122. The inner end of the front surface 118 terminates at the outer surface 112 of the body member 108. Extending perpendicularly outwardly from the backside of the flange 120 and integral therewith is a back body portion 126 defined by back end 128. The body portion 126 is further defined by inner and outer peripheral surfaces 130, 132. The inside diameter of body member 126 is just sufficient to accommodate the end of the communications cable 10. The front end of the cable is stripped of dielectric 22 and outside conductor 28 and extends through the circular-shaped opening 134 provided centrally in flange 120, terminating a predetermined distance short of the front end 114 of the front body member 108. The inner surface 130 of body member 126 is firmly secured to the outer surface of the outer conductor by an adhesive layer (not shown) as earlier disclosed.

Figure 5:
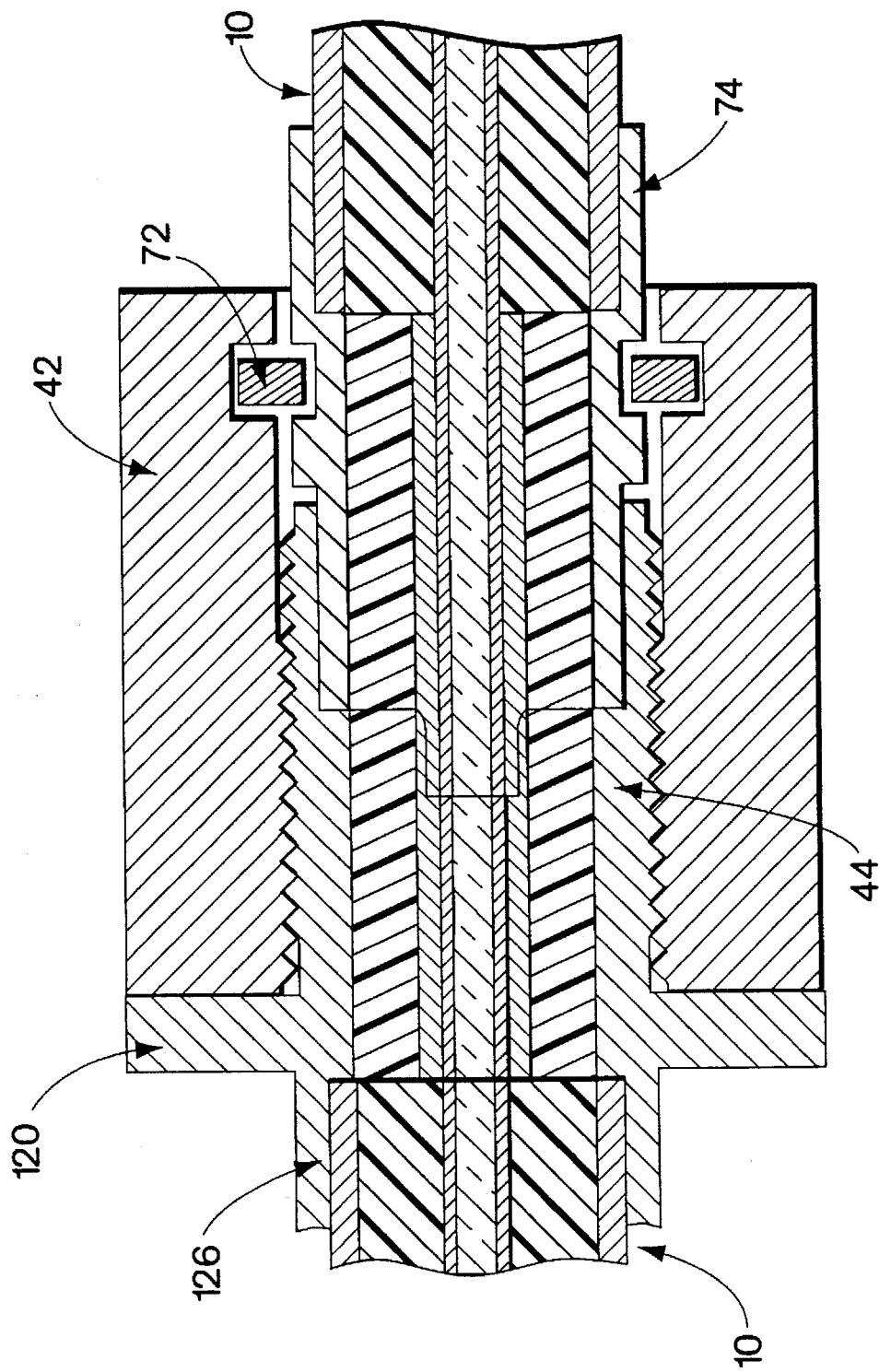
FIG. 5 is a longitudinal sectional view showing the connector in FIG. 5 in operative combination and connecting the ends of the two lengths of cable together.

The front end 114 of the body member 108 defines a radially disposed annular-shaped planar front edge the inner end of which defines a circular-shaped opening. This opening extends inwardly in the body member 108 from the front end 114 thereof and communicates with the narrower openings defined by circumferential surfaces 110 in body member 108 and 134 in the flange 120. As shown by the drawing, the opening defined by the front end 114 is of somewhat larger predetermined diameter than that defining the inner circumferential surface 110 whereby annular-shaped shoulder 136 is defined, such being in a plane parallel to that defined by the front end 114. The leading exposed end of the cable 10 is located in a tubular-shaped electrical contact 138 of predetermined length, the front end of which terminates in the plane defined by the shoulder 136. As shown by the drawing, the front ends of the optical fiber 12 and surrounding inner conductor 16 are in the same plane perpendicular to the inner peripheral surface 110 and terminate short of the front end of electrical contact 138 a predetermined distance. Thus, there is provided an opening in the electrical contact 138 somewhat like a dead-bore for receipt of the exposed end of electrical contact 100, when the female jack 44 and male plug housing 42 are assembled together as hereinafter disclosed and as shown in FIG. 5. Surrounding the electrical contact 138 is a dielectric member 140 of annular-shape for supporting the stripped end of the cable 10 and for maintaining the inner and outer conductors the desired radial distance apart.

On the outer circumferential surface 112 there is provided a thread pattern 142 complementary to the thread pattern 60 provided on the inner circumferential surface of the coupling nut 46. Thus, as will be appreciated, the outer diameter of the female jack and the inner diameter of the coupling nut must be such as to allow the female jack to be threaded into and coupled with the male plug member 74 in sealing engagement. Moreover, when connected together the male plug and female jack will comprise components that are concentric, the ends of which are in mating contact as shown in FIG. 5. Thus, there will provided continuity of the electrical and optical signals being transmitted, the interfacing electrical contacts 100 and 138 providing continuity in the inner conductor 16 and the mating of end surface 80 and shoulder 136 providing continuity for the outer conductor 28. It will be readily appreciated that the exposed ends of the optical fiber 12 need be polished according to conventional technique and be essentially coplanar when the two components of the connector 42 are in operative assembly. Those skilled in the art will readily appreciate that axial and radial alignment of the two ends of the optical fiber in intimate signal transmitting alignment is critical to attain low-loss optical signal coupling. The radial alignment is insured by the double male-female connections provided by the connector, as shown in FIG. 5, in combination with the closely dimensioned parts being interfaced with one another. Axial alignment is provided by grinding and polishing of the optical fibers ends so that when they are engaged one with the other such are essentially coplanar. The same male-female connections provide radial alignment and intimate electrical signal transmitting contact between the inner and outer electrical conductors. The axial alignment of the electrical conductors is attained in part through the male-female connections, as well as intimate contact between the electrical contacts 100 and 138, and the ends of the outer conductor in the male plug member 74 and back body portion 126.

Figure 6:
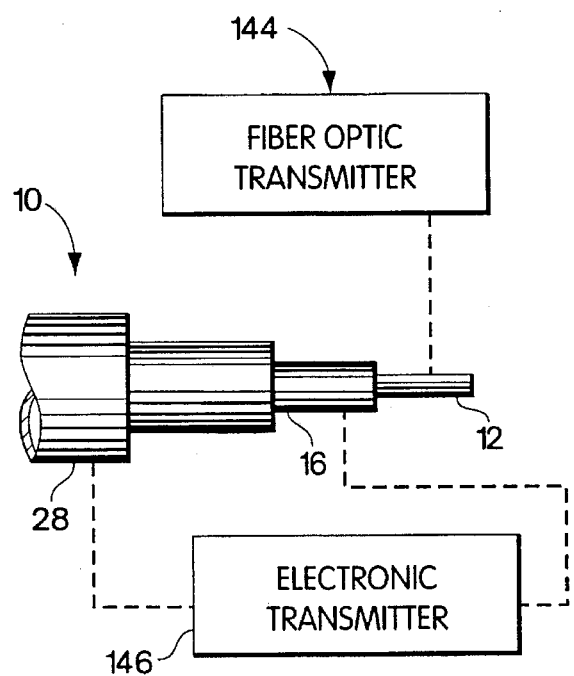
FIG. 6 is a partial cut away sectional view of a length of the communications cable of the invention showing in block diagram its transmission of high frequency electrical signals and at the same time secure optical signals.

Referring now to FIG. 6, a method of using a communications cable 10 according to the invention is schematically shown. A conventional fiber optic transmitter 144 is connected to the cable 10 using a connector such as is shown in FIGS. 4, 5, to provide an optical signal to the optical fiber conductor 12. And, a conventional electronic transmitter 146 is connected to the inner conductor 16 and outer conductor 28 for applying an electrical signal to the communications cable 10. Thus, electrical and optical signals can be transmitted at the same time over the communications cable as desired. The optical conductor 12 can be used to send a secure transmission, e.g., confidential military or business information. In the event a cable according to the invention is tapped by breaking the outer conductor, the loss in attenuation will be readily noticed. Thus, the tapping party will be led to believe that a non-confidential electrical signal is the only one being carried by the communications cable. Any attempt to tap the optical cable, in the unlikely event that the communications cable 10 is discovered to be sending simultaneous electrical and optical signals, will likely be to no avail. Optical cables are very difficult to tap to intercept optical signals being transmitted without destroying the optical cable itself.

The cables of the type to which the present invention pertains can be used wherever there is a requirement for both high frequency signal i.e., RF and microwave, and optical signal inputs. Examples of applications for a cable of this invention include phased array antenna elements, sequential scanning networks of multi-element antennas, and signal processing, e.g., radar surveillance, air traffic control, weapons control, communications satellite, and electronic scanning of signals from computers. The communications cable disclosed herein is particularly useful for transmitting through the optical fiber conductor financial data, military information, and the like that is desired to be kept confidential.

As will be understood by those skilled in the art, various modifications and changes can be made in the invention and its form and construction without departing from the spirit and scope thereof. The embodiments of the invention disclosed herein are merely exemplary of the various modifications that the invention can take and the preferred practice thereof. It is not, however, desired to confine the invention to the exact construction and features shown and described herein, but it is desired to include all such as properly come within the spirit and scope of the invention disclosed.

Having described the invention, what is claimed as new and secured by Letters Patent is:

1. A signal communications cable capable of simultaneous transmission of radio and microwave frequency and optical signals characterized by an operating temperature of from about −65 degrees C. to about 250 degrees C. comprising:
    (a) a core member comprising a single, circular-shaped optical fiber;
    (b) a uniform layer of electrically conductive material on and coaxially surrounding the optical fiber core member providing an inner electrical conductor;
    (c) a dielectric material on and coaxially surrounding the electrically conductive material layer; and
    (d) a solid metal electrical conductor surrounding the dielectric material and coaxial therewith and with the inner electrical conductor and optical fiber core, the signal communications cable having an overall diameter not greater than about 0.085 inches and the following radio frequency electrical characteristics:

| impedance | 50 ohms; |
| frequency | DC to 100 GHz; |

| frequency | attenuation db/100 ft @ 20 degrees C.; | average power watts, unity VSWR, 40 degrees C., ambient; |
| --- | --- | --- |
| 1 GHz | 33.0 | 32 |
| 10 GHz | 116.0 | 9 |
| 20 GHz | 170.0 | 6.5. |

2. A signal communications cable according to claim 1 having the following radio frequency mechanical characteristics:
    inner electrical conductor (glass metal clad) having an O.D. (inch) about 0.0113;
    dielectric of polytetrafluoroethylene having an O.D. (inch) about 0.037;
    outer conductor is copper having an O.D. (inch) about 0.047,
    said outer conductor having a wall thickness about 0.005 inches; and optical characteristics are:
    attenuation-about 1 db/km
    bandwidth- about 100–1500 MHz/km
    wavelength- about 850 through 1300 NM.

3. Method for providing a dual function communications cable capable of transmitting and receiving both electrical signals in the gigahertz frequency range and optical signals simultaneously comprising:
    (a) first providing an optical fiber of suitable predetermined diameter having a layer of an electrically conductive metal of predetermined diameter coaxially surrounding and adhering to said optical fiber and defining an outer circumferential surface;
    (b) extruding an annulus of dielectric material having a predetermined dielectric constant around said metal layer, said annulus having a predetermined outer and inner diameter and defining outer and inner circumferential surfaces, the inner circumferential surface of the said dielectric material coaxially surrounding and being in adhering contact with the said outer circumferential surface of the said metal layer;
    (c) providing an annulus of an electrically conductive metal in surrounding relationship with said dielectric material, said metal annulus being a solid tubular-shaped metal member having predetermined outer and inner diameters; and
    (d) drawing down the assembly formed in steps a, b, and c, in lengthwise direction to provide a communications cable of the desired outside diameter and to provide the metal layers in adhering contact with the circumferential surfaces of the dielectric material.

4. Method for the manufacture of a communications cable according to claim 2 wherein the optical fiber has an O.D. about 125 microns, the metal coated optical fiber is coated with a layer of aluminum and has an O.D. about 0.011 inches; the dielectric material comprises polytetrafluoroethylene having an annular-shape and has an I.D. about 0.011 inches, an O.D. about 0.037 inches; the outer conductor is a copper tube having an I.D. about 0.045 inches, an O.D. about 0.053 inches; and the final assembly is reduced to a communications cable having an O.D. about 0.047 inches, said reduction being made incrementally in a plurality of steps, each step reducing the diameter of the assembly in an amount about 0.0001 inches, the resulting communications cable having approximately the ductility of the initial copper tube, and having an adhesion level between the outer electrical conductor and dielectric material of at least about 6 lbs. on a 6 inch long length of cable.

5. Method for providing a dual function communications cable capable of transmitting and receiving both electrical signals and optical signal simultaneously comprising:
    (a) first providing an optical fiber of suitable predetermined diameter having a relatively thin layer of metal coaxially surrounding and adhering to said optical fiber and defining an outer circumferential surface;
    (b) depositing a second layer of metal on the metal layer so as to coaxially surround the first metal layer, said second metal layer being electrically conductive and having a predetermined resistivity against the transmission of the electrical signals and defining a second outer circumferential surface;
    (c) extruding an annulus of dielectric material having a predetermined dielectric constant around said second metal layer, said annulus having a predetermined outer and inner diameter and defining outer and inner circumferential surfaces, the inner circumferential surface of the said dielectric material coaxially surrounding and being in adhering contact with the said outer circumferential surface of the second metal layer;
    (d) providing an annulus of an electrically conductive metal in surrounding relationship with said dielectric material, said metal annulus having predetermined outer and inner diameters and being characterized by a predetermined electrical resistivity; and (e) drawing down the assembly formed in steps a, b, c and d in lengthwise direction to provide a communications cable of the desired outer diameter and to provide the metal layers on each side of the dielectric material in adhering contact with the circumferential surfaces of the dielectric material.

6. Means for connecting together two ends of a signal communications cable comprising the combination of a coaxial cable for transmission and reception of electrical signals and an optical fiber for transmission and reception of optical signals, said optical fiber having a predetermined diameter and being centrally disposed so as to form a core for the signal communications cable and comprising a solid, circular-shaped, elongated fiber, an inner, annular-shaped, electrical conductor coaxially surrounding said optical fiber core, and having predetermined inner and outer diameters, an outer, annular-shaped, solid electrical conductor coaxially surrounding said inner conductor and having predetermined inner and outer diameters, said outer conductor being radially, uniformly spaced from the outer diameter of the said inner conductor, and an annular-shaped dielectric material having predetermined outer and inner diameters and of a predetermined dielectric constant being located between the said inner and outer electrical conductors and coaxially surrounding the said inner conductor, said dielectric material maintaining the outer and inner electrical conductors in a desired uniform spatial relationship relative to one another and providing a desired uniform electrical impedance therebetween, the means for connecting comprising:

(a) a male plug housing comprising an annular-shaped coupling nut having a front end and a back end and being of predetermined inner and outer diameters defining inner and outer circumferential surfaces, a thread pattern being provided in the inner circumferential surface of the coupling nut from the front end of the coupling nut along at least a part of the length thereof, an elongated annular-shaped male plug member being located in the elongated opening provided by the inner circumferential surface of the coupling nut, said plug member being of predetermined inner and outer diameters less than the inner and outer diameters of the coupling nut and defining inner and outer circumferential surfaces, and means provided in operative association between the inner circumferential surface of the coupling nut and outer circumferential surface of the male plug member for retaining the two components in assembly together;

(b) an elongated tubular-shaped first electrical contact member open at both ends thereof and of predetermined length for location on an end of the communications cable and in surrounding, coaxial contact with the inner conductor, a length of outer conductor and dielectric material having been stripped from the cable of the same length as the predetermined length of the electrical contact member, said contact member having a lesser diameter at its front end for a predetermined length from the front end than the remainder of the contact member, said contact member being operatively associated with the male plug member;

(c) a second elongated tubular-shaped electrical contact member of predetermined length open at both ends thereof for location on another end of a communications cable in contact with the inner conductor, a length of outer conductor and dielectric material having been stripped from the cable of a somewhat lesser predetermined length than that of the second contact member, the inner diameter of the second contact member being somewhat greater at the front end of the contact member and for a predetermined length inwardly thereof equal to that of the lesser outer diameter of the first contact member;

(d) a jack member being operatively associated with the second electrical contact member comprising an elongated annular-shaped front member defined by front and back ends and inner and outer diameters defining inner and outer circumferential surfaces, a thread pattern being provided in the said outer surface of the front member complementary to that provided on the inner surface of the coupling nut, the outer diameter of the elongated front member of the jack member being such relative to the inner diameter of the coupling nut that these two members can be threadedly connected together and disconnected as desired, a circular-shaped receptacle being provided in the jack member and extending inwardly from the front end a predetermined distance and terminating in a radially disposed edge perpendicular to the length of the elongated member, said receptacle having a diameter and a predetermined length such that a predetermined length of the end of the male plug member can be located therein, the front edge of the male plug member being in contact with the said radially disposed edge and providing a block against further movement of the male plug member into the jack member when the jack member and male plug member are in operative assembly and the coupling nut is turned to bring those members in tight interface with one another, the front lesser diameter end of the first contact member being located in the front greater diameter end of the second contact member in male and female fashion, so that the ends of the optical fibers interface with one another and are in essentially the same plane.

* * * * *